United States Patent
Panoz

(10) Patent No.: US 6,665,935 B2
(45) Date of Patent: Dec. 23, 2003

(54) METHOD OF MAKING A VEHICLE CHASSIS OF EXTRUDED LINKS AND COUPLERS

(76) Inventor: Daniel E. Panoz, 2180 Rue Charlemage St., Braselton, GA (US) 30517

( * ) Notice: Subject to any disclaimer, the term of this patent is extended or adjusted under 35 U.S.C. 154(b) by 0 days.

(21) Appl. No.: 10/263,171

(22) Filed: Oct. 2, 2002

(65) Prior Publication Data

US 2003/0030303 A1 Feb. 13, 2003

Related U.S. Application Data

(62) Division of application No. 09/625,593, filed on Jul. 26, 2000, now Pat. No. 6,470,990.

(51) Int. Cl.[7] .............................................. B21D 53/88
(52) U.S. Cl. ................................. 29/897.2; 29/897.312; 29/897.35; 29/458; 29/466; 29/525.02; 29/530; 280/785; 403/170
(58) Field of Search ............................ 29/897, 897.2, 29/897.3, 897.312, 897.35, 424, 458, 464, 466, 525.01, 525.02, 525.13, 525.15, 527.1, 530, DIG. 47; 296/205, 203.01, 29; 403/402, 401, 231, 205, 170, 174, 178, 403, 267, 268, 265, 269, 266, 405.1, 406.1, 217, 407.1; 52/648.1, 655.1; 180/311; 280/785, 796, 797, 795, 798

(56) References Cited

U.S. PATENT DOCUMENTS

| | | |
|---|---|---|
| 3,912,295 A | 10/1975 | Eggert, Jr. |
| 3,958,653 A | 5/1976 | Arning et al. |
| 4,422,685 A | 12/1983 | Bonfilio et al. |
| 5,059,056 A | 10/1991 | Banthia et al. |
| 5,090,105 A | 2/1992 | DeRees |
| 5,338,080 A * | 8/1994 | Janotik et al. ................ 296/29 |
| 5,401,056 A | 3/1995 | Eastman |
| 5,628,481 A * | 5/1997 | Rinderer ...................... 248/58 |
| 5,715,643 A * | 2/1998 | Parkinson .................. 52/656.9 |
| 5,833,269 A | 11/1998 | Gastesi |
| 5,934,397 A | 8/1999 | Schaper |
| 5,947,519 A | 9/1999 | Aloe et al. |
| 5,954,447 A | 9/1999 | Bathon |
| 6,010,182 A | 1/2000 | Townsend |
| 6,134,787 A * | 10/2000 | Elsner et al. .............. 29/897.2 |
| 6,247,869 B1 | 6/2001 | Lichvar |
| 6,357,822 B1 * | 3/2002 | Panoz et al. ................ 296/209 |
| 6,416,119 B1 * | 7/2002 | Gericke et al. ............ 296/205 |

* cited by examiner

Primary Examiner—Charles T. Jordan
Assistant Examiner—T. Nguyen
(74) Attorney, Agent, or Firm—Brooks Kushman P.C.

(57) ABSTRACT

A method of manufacturing a vehicle chassis and a vehicle chassis that is formed in modules with couplers for connecting extruded beams. The method includes extruding a plurality of beams and a plurality of couplers that are loosely assembled together to a fixture having locating pins that are received in pockets formed on the couplers and securing the beams and couplers together to form a chassis. The chassis includes a center chassis module to which the fire wall bulkhead and passenger compartment are secured, a drive train and front suspension module to which the engine transmission and front suspension are attached, a rear suspension module to which the rear suspension and gas tank are secured, and front and rear crush modules including the front and rear bumper assemblies, respectively. Couplers used in forming the chassis include a central portion having an outer wall and a plurality of inner walls extending inwardly from the outer wall to the pocket. At least two receptacles are connected to and extend outwardly from the central portion of the coupler. The receptacles are sized to be received in a central opening of one of the extruded beams.

11 Claims, 5 Drawing Sheets

METHOD OF MAKING A VEHICLE CHASSIS OF EXTRUDED LINKS AND COUPLERS

CROSS-REFERENCE TO RELATED APPLICATIONS

This application is a division of U.S. application Ser. No. 09/625,593 filed Jul. 26, 2000 now U.S. Pat. No. 6,470,990.

TECHNICAL FIELD

The present invention relates to a method of making a chassis for a vehicle and to a chassis made with extruded beams that are connected by extruded couplers.

BACKGROUND OF THE INVENTION

A chassis is the backbone of a vehicle that provides a durable frame to which the body, drive train and other parts of a vehicle are assembled. A conventional vehicle chassis is formed of welded, stamped or forged steel beams that add considerable weight to a vehicle. With conventional steel chassis, it is a constant challenge to consistently form and assemble the chassis parts to meet close tolerances. The weight of a conventional chassis adversely impacts fuel economy. Recently, efforts have been made to eliminate conventional steel chassis.

One approach that addresses the disadvantages of a separate conventional steel chassis is the development of uni-body construction techniques wherein frame members are formed integrally with body parts that are assembled together to form the frame. With uni-body construction, different modules are integrally formed with portions of the frame that are then linked together by fasteners or welding. One challenge encountered with a uni-body type chassis includes maintaining close tolerances for proper vehicle fit and finish requirements. In the event that a uni-body vehicle is involved in a collision, it may be difficult or impossible to straighten the integral frame without adversely impacting other body panels.

Space frame construction techniques use welded steel or aluminum tubular members that are assembled together to manufacture some vehicles. However, space frame vehicles tend to be expensive to manufacture due to labor costs and extensive fixturing required to meet tolerances. One recent development relating to space frames is disclosed in U.S. Pat. No. 5,947,519 that proposes the use of specialized nodes to which frame rails are welded. The ends of frame members are peripherally welded to the node during the assembly process. Welding aluminum is a relatively expensive process requiring special aluminum welding rods. Welding causes localized heating of the rails and nodes that can result in deformation of chassis parts. Also, the approach disclosed in this patent does not provide an easy way to align frame rails to assure maintenance of close tolerances without the use of expensive assembly fixtures.

The present invention addresses the above problems and shortcomings of the prior art and provides a simple method of making a chassis and an improved chassis construction with additional benefits and advantages as summarized below.

SUMMARY OF THE INVENTION

According to the present invention, a method of manufacturing a chassis for a vehicle is provided. The method comprises extruding a plurality of beams, the beams having walls defining an internal surface. Beams are formed in different lengths depending upon the size of the chassis to be built. A plurality of couplers are extruded and have at least two generally horizontally extending receptacles sized to fit within the walls of the beam. Each coupler has a generally vertically oriented pocket formed between the receptacles. The couplers are assembled between beams by assembling the beams and couplers together loosely and to a fixture. The fixture has locating pins located at predetermined locations that are received in the pockets of the couplers. The beams and couplers are then permanently affixed to each other to form the chassis.

The step of securing the beams and couplers together is preferably performed by applying an aluminum bonding cement between the receptacles of the couplers and the beams. Alternatively, the beams and couplers could be secured together by forming holes in the ends of the beams and in corresponding locations on the couplers and inserting fasteners through the holes. The beams and couplers can also be assembled together by means of both cement and mechanical fasteners to provide a redundant securing system that may be desirable in some applications.

According to another feature of the present invention, the couplers are preferably extruded so that the receptacles have a closed end that is first inserted into one of the beams.

According to another aspect of the present invention, the couplers and/or beams may be formed with a recess having ribs extending in the direction of extrusion formation to facilitate the flow of cement between the receptacles and the beam. The ribs provide additional bonding surface area and additional surface structure that enhances bond strength.

According to yet another aspect of the present invention, the step of extruding the couplers may further include the step of extruding the coupler to form a pillar of the vehicle that extends upwardly from the beams that are joined by the coupler. The receptacle is separated from the pillar by cutting away a portion of the coupler for receiving a wall of the beam.

The method of the present invention may also include, as part of the step of extruding the coupler, forming a stop rib on the receptacles at the juncture of the receptacles and the central portion of the coupler.

The present invention also comprehends a chassis for a vehicle that is formed in five modules. A center chassis module is provided to which the fire wall bulkhead of the vehicle and passenger compartment of the vehicle are secured. A drive train and front suspension module is provided to which the engine, transmission and front suspension components are attached. The drive train module is secured to the front end of the center chassis module. The rear suspension and gas tank are secured to the rear suspension module. The rear suspension module is secured to the rear end of the center chassis module. A front crush module is attached to the drive train and front suspension module and includes a front bumper assembly. A rear crush module, including a rear bumper assembly, is separate from but secured to the rear suspension module. The chassis from front to rear includes the front crush module, the drive train and front suspension module, the center chassis module, the rear suspension module and the rear crush module.

According to the present invention, a passenger compartment trim ring may be provided as part of the vehicle that is assembled to the drive train and front suspension module, center chassis module and rear suspension module. The trim ring is a mid-body superstructure that forms a combined dashboard, two rocker panel covers and a well for a convertible top of the vehicle.

The unique modular chassis of the present invention is formed by at least one transverse rear beam that is connected on opposite sides to two rear couplers. Two side beams are connected on their back ends to each of the two rear couplers and two front couplers are connected to the front ends of each of the two side beams. Two convergent front beams are connected to the front couplers on their outer back ends and to the drive train and front suspension module on their forward ends.

According to yet another aspect of the present invention, the rear beam is preferably formed in two sections that are joined to a central drive shaft tunnel bracket.

A pair of hinge pillars may be assembled to the front couplers with one hinge pillar being secured to each of the front couplers to extend upwardly to the base of the windshield frame.

According to another aspect of the present invention, the couplers may connect adjacent beams in a range of angular orientations from 0 to 180 degrees. However, the couplers may connect beams at approximately 90 degrees or approximately 135 degrees. By approximately, it is intended that the angular orientations be within 15 degrees of 90 or 135 degrees.

According to another unique feature of the invention, the coupler may include a pillar of the vehicle that extends upwardly from the receptacle. The pillar is formed above the receptacle of the coupler over which the beam is received.

A further aspect of the invention is the concept of forming a stop rib on the receptacles of the couplers at the juncture of the receptacles and the central portion of the coupler.

Another feature of the present invention relates to the structure and function of the coupler used in forming the chassis. The coupler includes a central portion having an outer wall and a plurality of inner walls extending inwardly from the outer wall to a pocket that is connected to the inner walls. At least two receptacles are connected to and extend outwardly from the central portion. The receptacles are dimensioned to be received in the central opening of one of the extruded beams. The central pocket is adapted to be placed on a locating pin of a fixture that is used to align the coupler with the extruded beams and other couplers. The central opening in the extruded beam may be rectangular in shape and that the receptacles would in turn be rectangular in shape having a closed end that is formed as an extruded wall on the opposite side of the receptacle from the central portion. The receptacle also includes two side walls that are formed as extruded walls connecting the end wall to the central portion.

As explained above in the context of the chassis construction, the couplers may be formed with a wide variety of angular relationships between receptacles. The couplers may include recesses having ribs extending in the direction of the extrusion to facilitate flow of cement and augment bonding as described above. Likewise, the coupler may include a pillar of the vehicle that extends upwardly from the receptacle. The couplers may include stop ribs formed on the receptacles.

These and other advantages and features of the present invention will be apparent to one of ordinary skill in the art in view of the attached drawings and following detailed description.

BEST MODE FOR CARRYING OUT THE INVENTION

Figure 1:
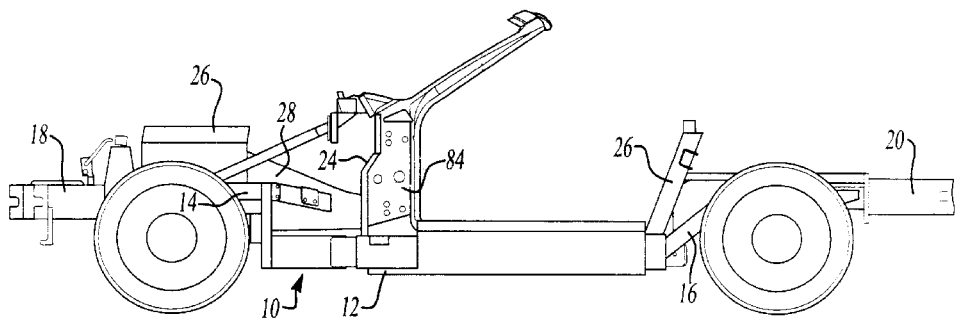
FIG. 1 is a side elevation view of a vehicle chassis made in accordance with the present invention.
Figure 2:
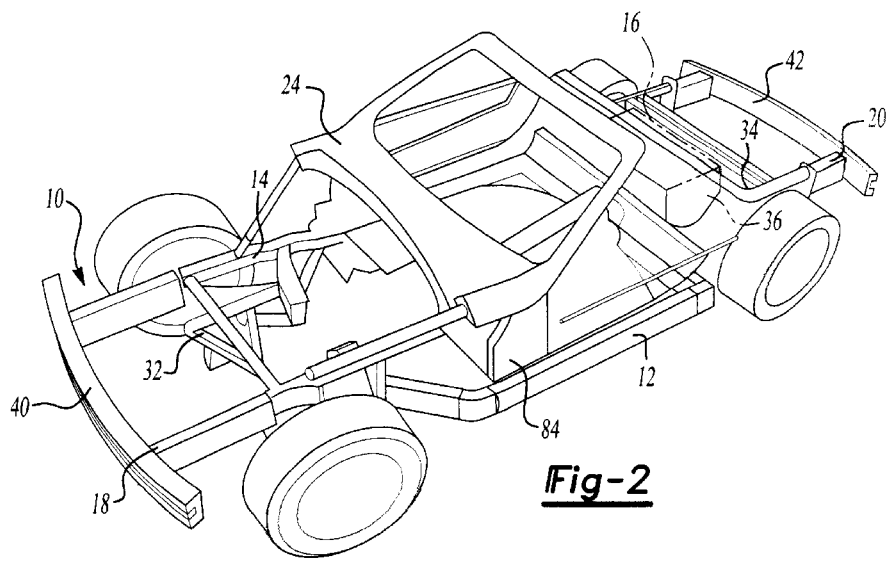
FIG. 2 is a perspective view of a vehicle chassis made in accordance with the present invention.

Referring now to FIGS. 1 and 2, a chassis 10 made in accordance with the present invention is shown. The chassis 10 includes a center chassis module 12. A drive train and front suspension module 14 is attached at the forward end of the center chassis module 12. A rear suspension module 16 is attached to the rear of the center chassis module 12. A front crush module 18 is attached to the front of the drive train and front suspension module 14. A rear crush module 20 is attached to the rear suspension module 16. Each module may be separately assembled as a module and then attached to each of the other modules to form a chassis 10.

A fire wall bulkhead 24 is attached to the center chassis module 12. A specialized vehicle may be manufactured utilizing many components from a production vehicle and, in particular, many components relating to the drive train and instrument panel. In this way, vehicle controls, heating, ventilation and air conditioning and drive train components may be assembled to the chassis in a modular approach, thereby minimizing modifications to the production vehicle components and systems. The passenger compartment 26 of the vehicle is built on the center chassis module 12, while the engine 26 and transmission 28 of a production vehicle are assembled to the drive train and front suspension module 14.

The front suspension 32, preferably an independent coil spring suspension, is connected to the drive train and front suspension module 14. The rear suspension 34 is secured to the rear suspension module 16. A fuel tank 36 is also connected to the upper portion of the rear suspension module 16. A front bumper 40 is connected to the front crush module 18. A rear bumper 42 is secured to the rear crush module 20. The front and rear bumpers 40 and 42, respectively, are preferably formed as curved extruded aluminum members.

Figure 3:
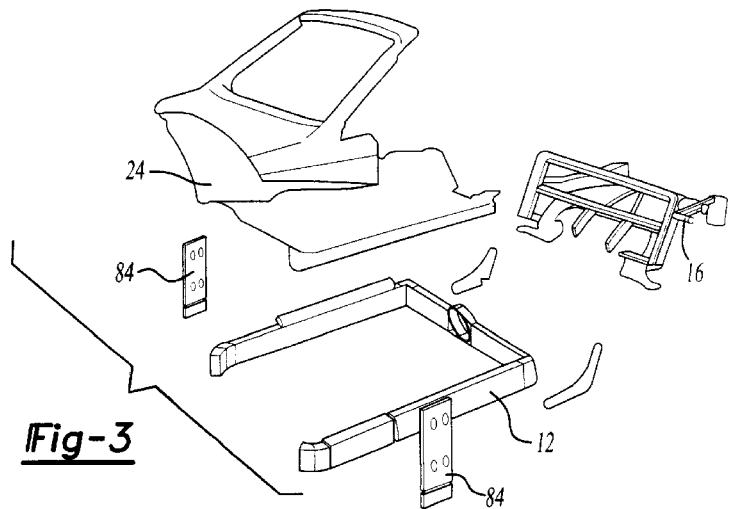
FIG. 3 is an exploded perspective view of a center chassis module and rear suspension module made in accordance with the present invention.

Referring to FIGS. 3–6, a series of steps in the chassis manufacturing process are shown in sequence. In FIG. 3, the center chassis module 12, rear suspension module 16 and fire wall bulkhead 24 are shown ready for assembly.

Figure 4:
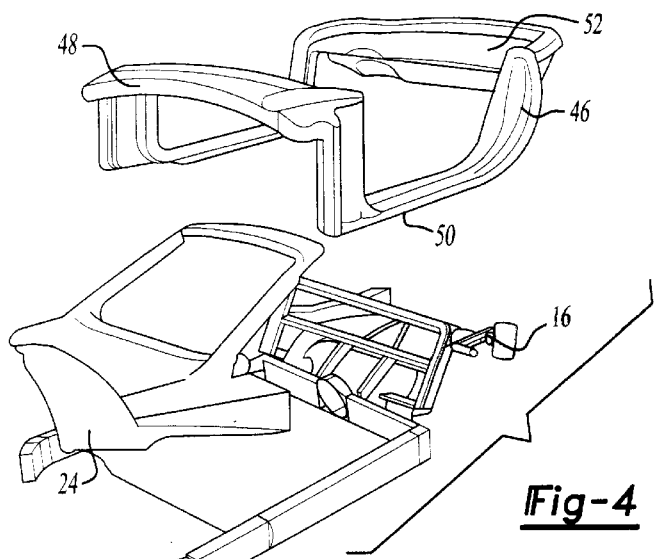
FIG. 4 is an exploded perspective view of a center chassis module, rear suspension module and trim ring made in accordance with the present invention.

Referring to FIG. 4, the parts shown in FIG. 3 are assembled and a trim ring 46 is shown ready for assembly to the components of FIG. 3. The trim ring 46 is a monolithic structure that extends around the passenger compartment. The trim ring 46 comprises a dashboard 48, two running boards 50 extending on opposite sides rearwardly from the dashboard, and a convertible top well 52 interconnects the rear ends of the running boards 50. While a convertible top well 52 is shown, if the vehicle to be assembled is a hardtop, a package tray would be included instead of the convertible top well 52 as part of the trim ring 46. The trim ring 46 serves to tie together the modules forming the passenger compartment assuring acceptable fit and finish of the components making up the passenger compartment.

Figure 5:
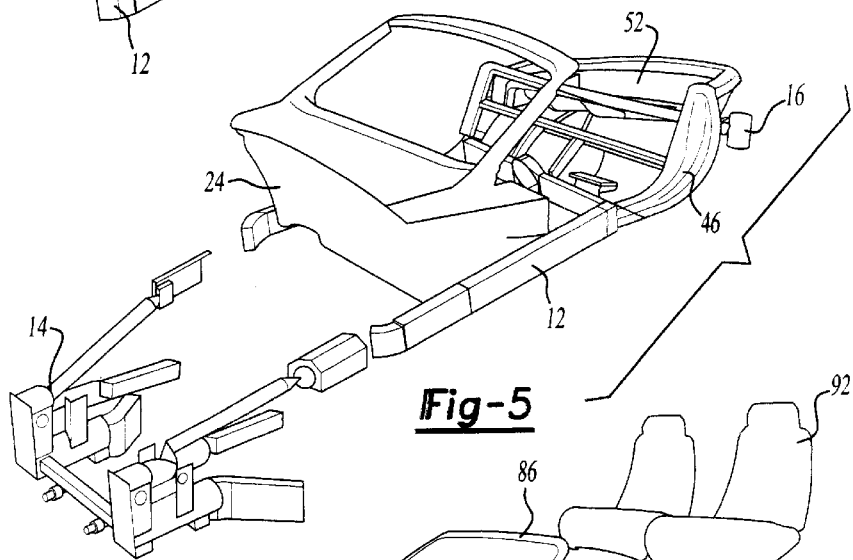
FIG. 5 is an exploded perspective view of the components shown in FIG. 4 shown with a drive train and front suspension module in accordance with the present invention.

Referring now to FIG. 5, the parts shown in FIG. 4 are assembled and the drive train and front suspension module 14 is shown ready for assembly to the components of FIG. 4.

Figure 6:
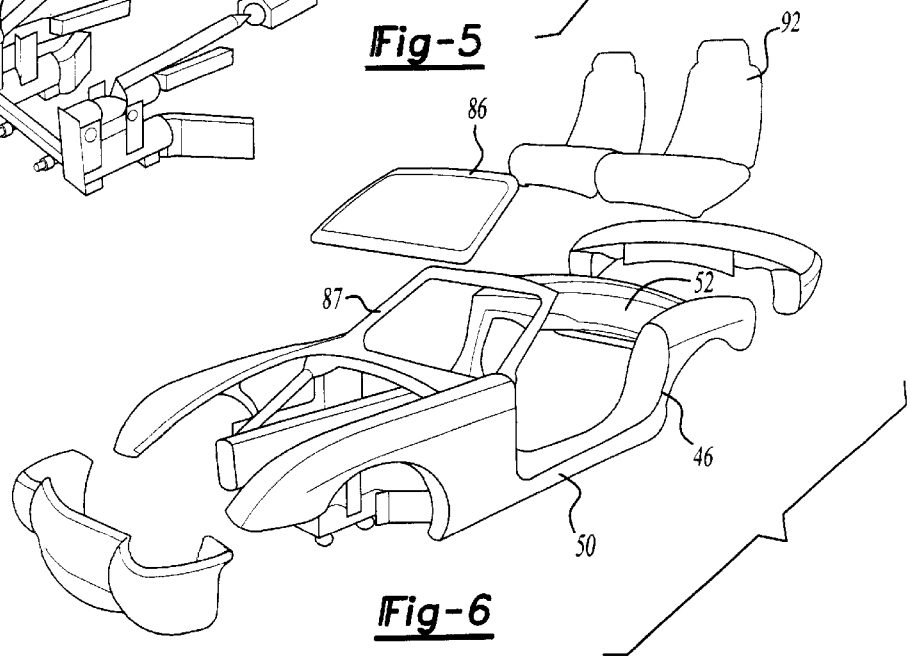
FIG. 6 is an exploded perspective view of a partially assembled vehicle body made in accordance with the present invention.

Referring now to FIG. 6, body panels of the vehicle are assembled to the chassis.

Figure 7:
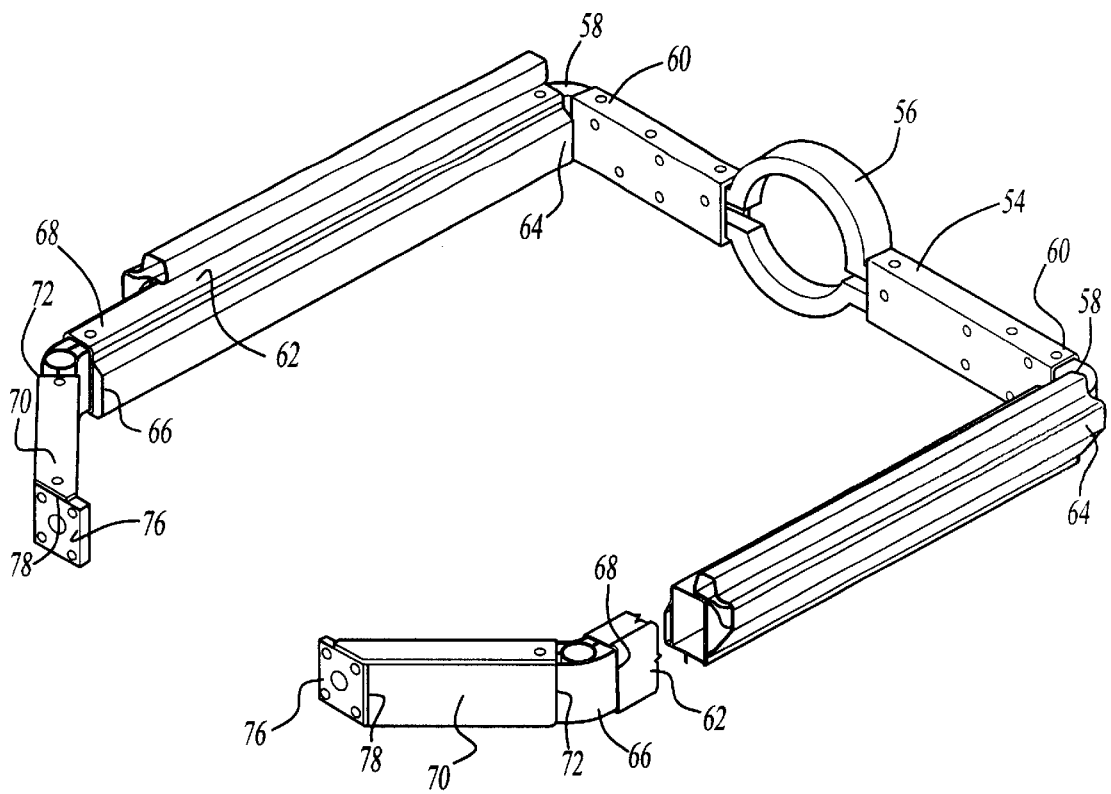
FIG. 7 is a perspective view of a center chassis module made in accordance with the present invention.

Referring now to FIG. 7, the standard chassis module 12 is described in detail. A rear beam 54 is preferably formed in two parts that are connected to a drive shaft tunnel bracket 56. The drive shaft of the vehicle extends through the drive shaft tunnel bracket 56 to connect the rear axle differential (not shown) to the vehicle transmission 28. On opposite lateral ends of the rear beam 54, rear couplers 58 are provided. Rear couplers 58 are connected to the opposite ends 60 of the rear beam 54. Rear couplers 58 connect the rear beam 54 to side beam 62. The back end 64 of the side beams 62 are received on the rear couplers 58. Front couplers 66 are assembled to the front end 68 of the side beam 62. Convergent beams 70 are connected to the front couplers 66 on their outer back end 72. The forward and inward ends of the convergent beams 70 are attached to drive train plate 76 on the inner front end 78 of the convergent beams 70.

It should be understood that couplers could be extruded having any angular orientation between the beams joined by the couplers depending upon the design of the vehicle. The rear couplers 58 join the rear beam 54 to the side beam 62 in a right angle relationship. Front couplers 66 in illustrated embodiment join the side beam 62 to the convergent beams 70 at an angular relationship of approximately 135 degrees. This angular relationship could be changed depending upon styling and vehicle design considerations. Also, the length of the rear beam 54 can be modified to change the width of the vehicle, while the length of the side beam 62 or convergent beams 70 could be modified to change the length of the vehicle and size of the passenger compartment.

Figure 8:
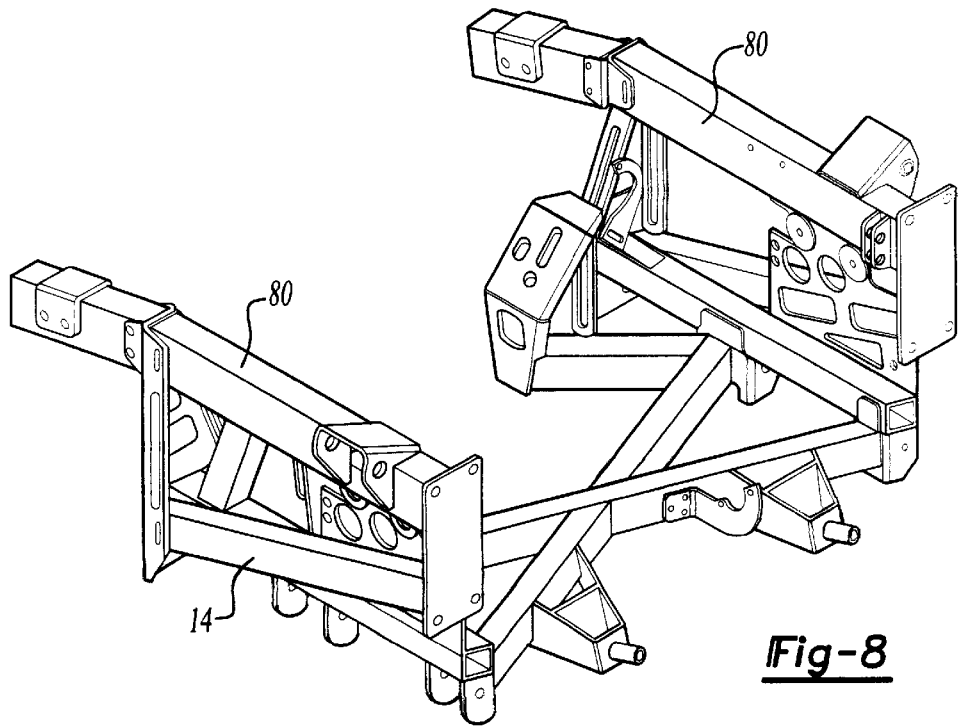
FIG. 8 is a perspective view of a drive train and front suspension module made in accordance with the present invention.

Referring now to FIG. 8, the drive train and front suspension module 14 is shown in isolation. A pair of engine support beams 80 extend in a forward direction from the drive train plate 76 and are provided with brackets and plates for mounting the engine and also mounting the front crush module 18. By providing a front crush module 18 that is separate from the drive train and front suspension module 14, it is possible to minimize damage to the vehicle in the event of a front end collision by designing the front crush module 18 to absorb the energy of an impact. The front crush module 18 then may be replaced separate from the drive train and front suspension module 14 facilitating repair and reconstruction of the vehicle.

Figure 9:
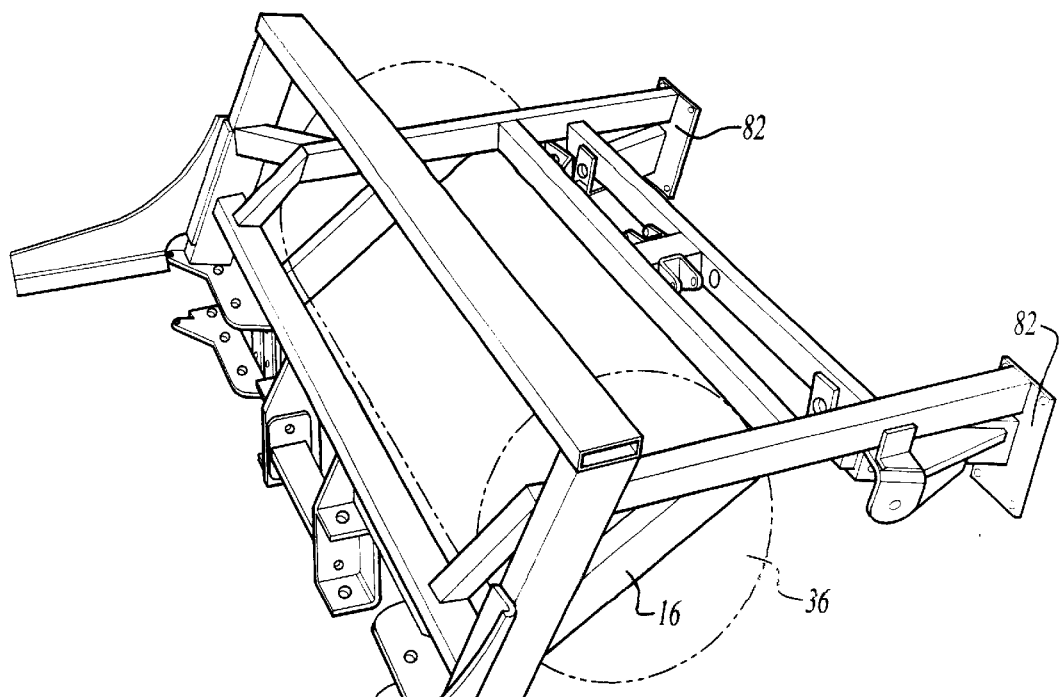
FIG. 9 is a perspective view of a rear suspension made in accordance with the present invention.

Referring now to FIG. 9, the rear suspension module 16 is shown in isolation. The rear suspension module 16 supports the gas tank for the vehicle and the rear suspension 34. Rear suspension 34 is preferably an independent rear suspension. The rear crush module 20 is attached to plates 82 that are part of the rear suspension module 16. The separate rear crush module 20 reduces repair and reconstruction costs in the event of a rear collision similar to the front crush module 18 as described above.

Referring to FIGS. 1, 2 and 3, hinge pillar 84 is shown interconnecting the center chassis module 12 to the fire wall bulkhead 24.

As shown in FIG. 6, a windshield 86 is assembled to the fire wall bulkhead 24 that is shown to include the windshield frame 87. Seats 92 are assembled to the center chassis module 12 in the passenger compartment 26.

Figure 10:
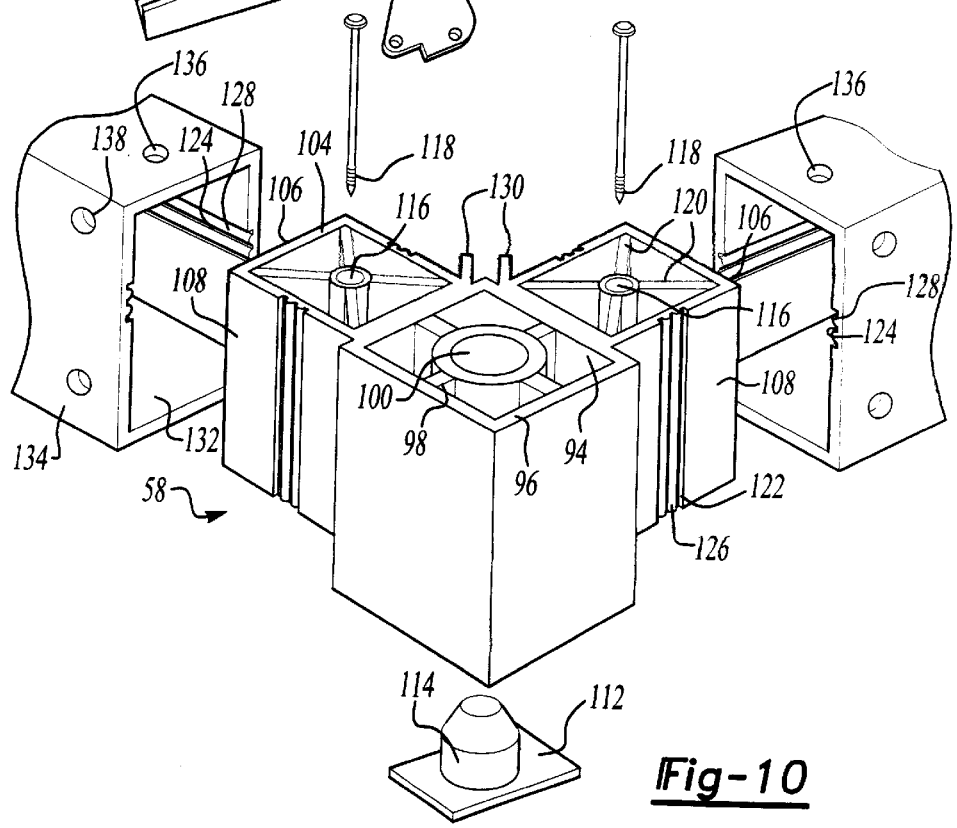
FIG. 10 is a perspective view of a right angle coupler and a fragmentary perspective view of a beam in exploded perspective.
Figure 11:
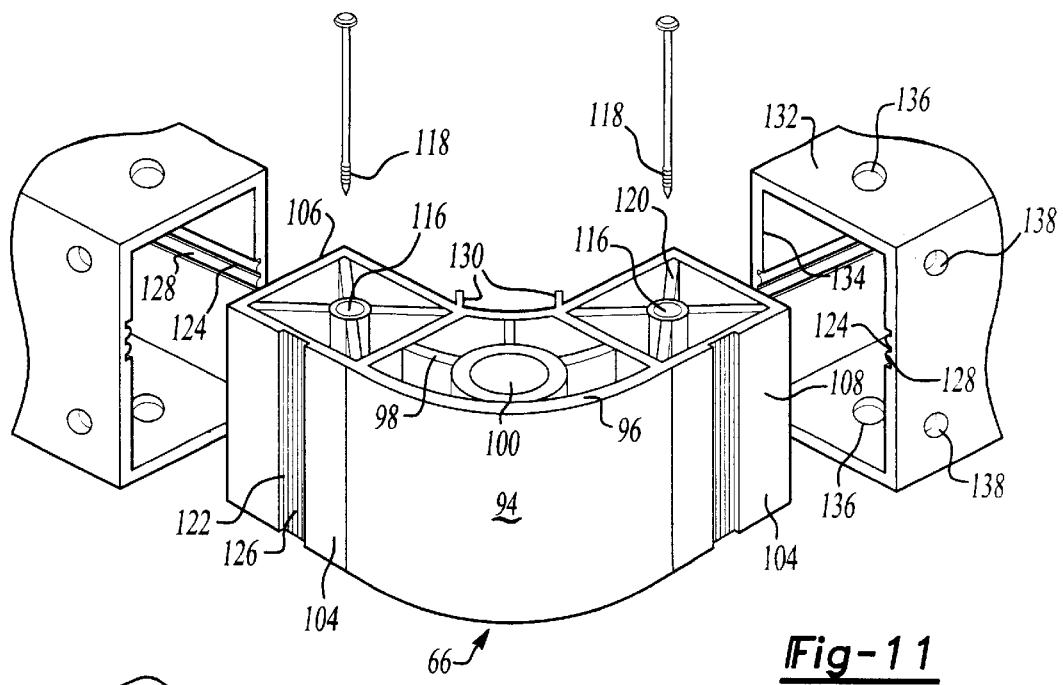
FIG. 11 is a perspective view of an oblique angle coupler and fragmentary perspective view of a beam in exploded perspective.

Referring now to FIGS. 10 and 11, an example of a rear coupler 58 and a front coupler 66 are illustrated in the respective figures. The same reference numerals are used for similar parts of the couplers.

Each coupler has a central portion 94 having an outer wall 96 and inner walls 98 connecting the outer wall 96 to a pocket 100. Each coupler has two receptacles 104 that extend from the central portion 94 at a predetermined angular orientation. In FIG. 10, the angular orientation is 90 degrees or a right angle. In FIG. 11, the angular orientation of the receptacles 104 relative to the central portion 94 is 135 degrees. The receptacles 104 have closed end walls 106 and side walls 108. Each type of coupler is preferably extruded as a single extrusion and cut to the desired size.

The couplers are assembled together with beams and located on a fixture 112 having a locating pin 114. The fixture 112 is only partially shown in FIG. 10 and would include locating pins 114 for each of the pockets 100 on the several couplers of the chassis. The beams are loosely assembled together with the couplers and placed on the fixture1 12 that precisely locates the couplers.

Holes 116 are provided in the receptacles 104 for receiving fasteners 118 that may be used to secure the couplers to the beams. Inner walls 120 are provided within the receptacles 104 to reinforce the receptacles 104 and provide structure to define the holes 116.

A glue recess 122 may be formed on the coupler. Another glue recess 124 may be provided on the beam. The purpose of the glue recess is to provide space for receiving aluminum bonding cement between the couplers and the beams. As the couplers and beams are formed, vertical ribs 126 may be formed in the glue recess 122 on the coupler and longitudinal ribs 128 may be formed in the glue recess 124 on the beam. Stops 130 may be provided adjacent or near the junction of the receptacles 104 and the central portion 94 to align the beam on the coupler.

The beams include horizontal walls 132 and vertical walls 134. Holes 136 may be provided in the horizontal walls of the beam 132 for receiving the fastener 118. Glue injection holes 138 are provided in the vertical walls 134 of the beam. Glue is injected into one of the glue injection holes 138 and caused to flow into the space between the beam and the receptacle 104. If the glue recesses are provided on the coupler and the beam and ribs are provided as previously described, glue injected into the holes 138 may fill the recesses and adhere to the ribs to provide a high strength attachment mechanism.

Figure 12:
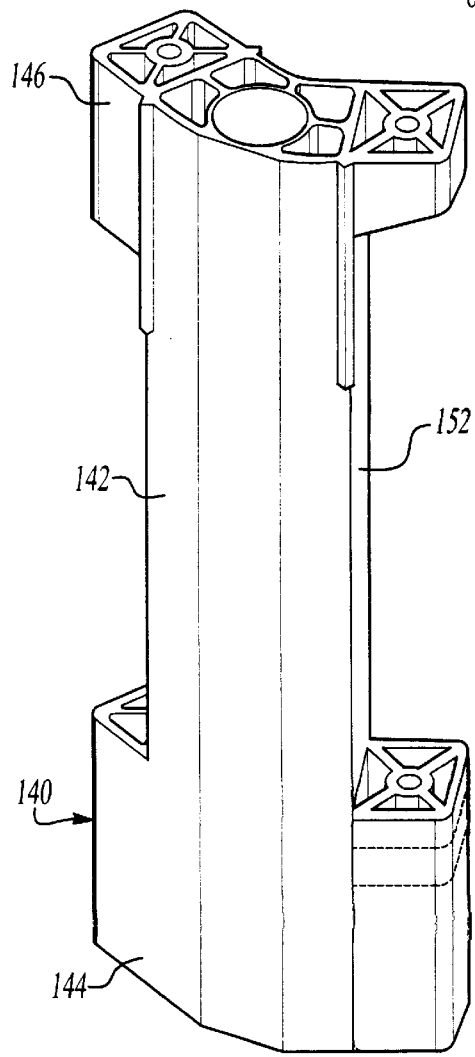
FIG. 12 is a perspective view of an oblique angle pillar/coupler.

Referring now to FIG. 12, a pillar/coupler 140 is shown that combines the coupler with one of the A, B or C pillars of the vehicle. The A pillar may also be referred to as a hinge pillar and is the pillar immediately below the windshield frame to which the hinges of the front doors of the vehicle are attached. The B pillar is the mid-passenger compartment pillar to which the front doors of the vehicle close and for sedan vehicles is the pillar on which the rear door hinges are mounted. The C pillar is provided on sedans in the back portion of the passenger compartment and is the pillar to which the rear doors are closed.

The pillar/coupler 140 shown in FIG. 12 is initially formed as a single extrusion. The extrusion is then cut away to form a pillar portion 142. A lower coupler portion 144 is provided when the pillar portion 142 is formed. The height of the lower coupler portion 144 is cut to the height necessary to accommodate assembly of the side or other rail section. The upper coupler portion 146 is also formed when the extrusion is cut away to form the pillar portion 142. The upper coupler portion 146 may be assembled to a cross car beam in a manner similar to which the beams are connected to the lower coupler. A hinge mounting surface 152 may be provided on the rear facing surface of the pillar/coupler 140 to permit mounting the door hinges of the doors of the vehicle on the pillar coupler 140.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a chassis for a vehicle comprising:
   extruding a plurality of beams, the beams having a wall defining an internal surface and being formed in different lengths depending upon the size of the chassis to be built;
   extruding a plurality of couplers having at least two generally horizontally extending receptacles being sized to fit within the internal surface of the beam and onto over each of which one of the beams is assembled, each coupler having a generally vertically oriented pocket formed between the receptacles;
   loosely assembling the beams and couplers together and placing the pocket onto a fixture having locator pins that precisely locate the couplers; and
   securing the beams and couplers together to form the chassis.

2. The method of claim 1 wherein the step of securing the beams and couplers together comprises applying aluminum bonding cement between the receptacles of the couplers and the beams where they are assembled over the receptacles.

3. The method of claim 1 wherein the step of securing the beams and couplers together comprises forming holes in the ends of the beams and in corresponding locations on the couplers when assembled and connecting the beams and couplers with fasteners that are vertically inserted through the holes.

4. The method of claim 1 wherein the step of securing the beams and couplers together comprises applying aluminum bonding cement between the receptacles of the couplers and the beams where they are assembled over the receptacles and forming holes in the ends of the beams and in corresponding locations on the couplers when assembled and connecting the beams and couplers with fasteners that are vertically inserted through the holes.

5. The method of claim 1 wherein the step of extruding the couplers includes forming receptacles that have a closed end that is first inserted into one of the beams.

6. The method of claim 1 wherein the couplers have a recess formed on at least one face of the receptacles to facilitate the flow of cement between the receptacles and the beam.

7. The method of claim 6 wherein the recess has vertical ribs extending in the direction of extrusion formation to provide additional bonding surface area and additional surface features to enhance bond strength.

8. The method of claim 1 wherein the beams have a recess formed on at least one face of the internal surface to facilitate the flow of cement between the receptacles and the beam.

9. The method of claim 8 wherein the recess has longitudinal ribs extending in the direction of extrusion formation to provide additional bonding surface area and additional surface features to enhance bond strength.

10. The method of claim 1 wherein the step of extruding the couplers further includes the step of extruding the coupler to form a pillar of the vehicle with the coupler that extends upwardly from the beams joined by the coupler, the receptacle being formed by removing a portion of the coupler above the receptacle to facilitate the beam being received by the receptacle.

11. The method of claim 1 wherein the step of extruding the coupler further includes extruding a vertical stop rib at the juncture of the receptacles and the central portion of the coupler.

* * * * *